United States Patent
Altwasser

[11] Patent Number: 6,164,551
[45] Date of Patent: Dec. 26, 2000

[54] RADIO FREQUENCY IDENTIFICATION TRANSPONDER HAVING NON-ENCAPSULATED IC CHIP

[75] Inventor: Richard Altwasser, Forst, Germany

[73] Assignee: Meto International GmbH, Hirschhorn, Germany

[21] Appl. No.: 09/181,555

[22] Filed: Oct. 29, 1998

[30] Foreign Application Priority Data

Oct. 29, 1997 [WO] WIPO ............. PCT/EP97/05975
Dec. 3, 1997 [DE] Germany ............. 197 53 619

[51] Int. Cl.⁷ ............................................. G06K 19/06
[52] U.S. Cl. .................. 235/492; 235/472.02; 235/488; 235/385; 235/383; 343/872; 343/895
[58] Field of Search ................ 235/492, 472.02, 235/488, 383, 385; 343/872, 895

[56] References Cited

U.S. PATENT DOCUMENTS

| | | | |
|---|---|---|---|
| 4,752,680 | 6/1988 | Larsson | 235/492 |
| 5,508,684 | 4/1996 | Becker | 340/572 |
| 5,708,419 | 1/1998 | Isaacson et al. | 340/572 |
| 5,939,984 | 8/1999 | Brady et al. | 340/572.1 |
| 5,962,834 | 10/1999 | Markman | 235/385 |
| 5,963,177 | 10/1999 | Tuttle et al. | 343/872 |
| 6,013,949 | 1/2000 | Tuttle | 257/723 |
| 6,027,027 | 2/2000 | Smithgau | 235/488 |

FOREIGN PATENT DOCUMENTS

| | | |
|---|---|---|
| 3143915A1 | 5/1983 | Germany. |
| 4334537A1 | 4/1995 | Germany. |
| 19527359A1 | 2/1997 | Germany. |
| 19534229A1 | 3/1997 | Germany. |
| 19601203A1 | 3/1997 | Germany. |
| 19549343A1 | 4/1997 | Germany. |
| 19538917C2 | 8/1997 | Germany. |
| 19604774A1 | 8/1997 | Germany. |
| 19614914A1 | 10/1997 | Germany. |
| 19720747A1 | 11/1997 | Germany. |
| WO 96/07985 | 3/1996 | WIPO. |
| WO 96/36937 | 11/1996 | WIPO. |

*Primary Examiner*—Michael G Lee
*Attorney, Agent, or Firm*—Jones, Tullar & Cooper, P.C.

[57] ABSTRACT

The present invention is directed to an identification element having an integrated circuit and an antenna coil (⇨ RFID transponder) connected to the integrated circuit, as well as to a method of manufacturing such an identification element. The present invention provides an economically priced identification element and a method of manufacturing such an identification element. The integration circuit is a non-encapsulated chip and the antenna coil comprises at least one layer of a metallic coating.

11 Claims, 1 Drawing Sheet

RADIO FREQUENCY IDENTIFICATION TRANSPONDER HAVING NON-ENCAPSULATED IC CHIP

FIELD OF THE INVENTION

The present invention relates to an identification element having an integrated circuit and an antenna coil (→RFID transponder) connected to the integrated circuit, as well as to a method of manufacturing such an identification element.

BACKGROUND OF THE INVENTION

The advantage of RFID transponders compared to the barcodes predominantly used in particular in the goods marking sector is that they permit a direct exchange of information, meaning that no visual contact is needed between the interrogating device and the transponder for the information transfer. Unlike barcodes, furthermore, it is an easy matter with RFID transponders to change their information content directly as and when required.

RFID transponders are constructed as either passive or active elements. If the RFID transponder is used as an active element, the housing enclosing the integrated circuit contains an additional energy source usually in the form of a battery. RFID transponders are able to operate in the most diverse frequency ranges, for example, in the low frequency range at 125 kHz, in the medium frequency range at 13.56 MHz or in the microwave range at typically 2.45 GHz. The present invention relates preferably—but by no means exclusively—to passive transponders operating in the medium frequency range.

A data carrier with an integrated circuit is known in the art from European Patent EP 0 682 321 A2. This data carrier is comprised of a card body and an integrated circuit connected electrically via contact elements to at least one oil composed of one or several layers. The two elements combine to form a resonant circuit which operates at a predetermined resonant frequency. The purpose of the coil is to supply energy and/or to exchange the data of the integrated circuit with external devices. Circuit and contact elements are constructed as a separate module.

The disadvantage of the known RFID transponders compared to barcodes is the immense difference in price between the two elements. This is also the reason why the use of RFID transponders in the sales sector has been restricted so far to fringe areas. In particular there has been no interest to date in using RFID transponders to present price information or other data when selling mass products in department stores and warehouses. Up to now an RFID transponder has cost in the region of about 16, which naturally makes their use as disposable identification markers completely out of the question.

It will be understood, of course, that RFID transponders find application in the most diverse areas, particularly in the fields of production, further processing and transportation of goods as well as in security applications. Examples include the identification marking of people and animals, the identification marking of baggage and packages, particularly at airports and post offices, and the identification marking of vehicles during their production or in multistory car parks.

SUMMARY OF THE INVENTION

It is an object of the present invention to provide an economically priced identification element and a method of manufacturing such an identification element.

This object is accomplished with respect to the identification element in that the integrated circuit is a non-encapsulated chip (meaning an integrated circuit without a housing), and that the antenna coil is comprised of at least one layer of a metallic coating. Costs are saved by the identification element of the present invention in two ways: On the one hand it is possible to dispense with the relatively expensive encapsulation of the chip in a housing, and on the other hand an antenna coil is used that is a low-cost item yet works to optimum effect and has very good adjustment capabilities. In this connection it has proven very advantageous for the antenna coil to be manufactured from punched metal foil made of low-cost aluminum or, alternatively, of copper. The advantage of copper is that it displays excellent conductivity and can also be combined to very good effect with other materials.

It will be understood, of course, that it is also possible for the coil to be manufactured by printing with an electrically conductive ink (for example, polymer ink with silver particles), by etching a coil by chemical means or by using a wire winding. Using a machine to punch the coil out of a suitable metal foil is preferred, however, because this method affords the greatest advantages not only with regard to the manufacturing cost but also with a view to applicable environmental protection regulations.

Metal foils for producing the coil typically come in a thickness of less than 100 $\mu$m, preferably the thickness lies between 20 and 50 $\mu$m. An additional advantage of using these very thin and flexible foils as coil material is that the end product, meaning the finished RFID transponder, is similarly flexible and thin and hence eminently suited for use in the manufacture of labels/tags: The label's/tag's surface waviness caused by integrating a thin coil is likewise so negligible as to enable the practically smooth surface of the label/tag to be printed in the customary way.

In accordance with an advantageous further aspect of the identification element of the present invention, the non-encapsulated chip is connected to the antenna coil by means of a contacting method employed in the production of semiconductors, for example, by the use of conductive adhesives, by soldering, by means of the flipchip method, etc. Methods of this type are described in detail on pages 25/14 to 25/21 of the Electronics Engineer's Reference Book, 6th Edition, "Integrated circuit packaging". The description of the various contacting methods shall be deemed to be incorporated in the disclosure of the present invention by express reference.

In an advantageous aspect of the identification element of the present invention, the antenna coil is constructed to form a resonant circuit. A method of manufacturing such resonant circuits at low cost and high precision, that is, with small tolerance fluctuations with respect to their quality, is disclosed in European published application EP 0 665 705. The corresponding description of the method proposed in this European published application shall be deemed to be equally incorporated in the disclosure content of the present invention by express reference, particularly in the disclosure content of the method of the present invention.

Resonant circuits manufactured in accordance with the method described in EP 0 665 705 are characterized by very small manufacturing tolerances. The punched antenna coils have capacitance tolerances of approximately 3%, whereas capacitors manufactured on a semiconductor chip have a manufacturing tolerance of approximately 20%. For this reason it is particularly advantageous if the capacitance is determined essentially by the antenna coil rather than the circuit. In this case it possible to dispense with a tuning capacitor in the chip itself because there is generally no longer any need for the capacitance of the antenna coil to be tuned subsequently on account of the relatively small tolerances. Obviously, dispensing with a tuning capacitor helps to minimize the cost of manufacturing the RFID transponder of the present invention.

The above statement is made clear below by way of example: A capacitor comprised of two at least partly overlapping coils made of metal foil has a tolerance of 3% and less. By contrast, a capacitor integrated in a semiconductor circuit has a tolerance of 20% and more. If the circuit made the major contribution to the total capacitance, the resonant circuit would need to be tuned after connecting the integrated circuit to the coil in order to obtain an acceptable tolerance of 5%. If, on the other hand, the antenna coil makes the major contribution (approximately 80%) to the capacitance, as is proposed by the present invention, then the tolerance of 5% is obtainable without subsequent tuning.

If it ever proves necessary to tune the frequency of the antenna-coil this can still be done of course after the integrated circuit is connected to the antenna coil. This tuning is performed by changing the capacitance or the inductance, for example. A change of capacitance can also result from a change of distance between two layers of the antenna coil caused by the local input of heat. It is possible furthermore to subsequently change the size of the capacitor surface. In conclusion it can be said that dispensing with a tuning capacitor in the circuit makes an additional contribution to reducing the cost of the RFID transponder of the present invention.

According to an advantageous aspect of the identification element of the present invention, the quality of the resonant circuit (Q-factor) is high, at least higher than 50. Communication with the RFID transponder can thus be extended to a larger area range.

Exactly how sensitive the identification element is to static charges from close lying capacitive bodies such as a hand, a bottle with an aqueous liquid or a coating of plastic material, for example, depends essentially on the total capacitance of the antenna coil. The lower the capacitance, the sooner the resonant circuit turns off-resonance by static charges of this type. Let us consider again the difference between the conventional capacitors found in integrated circuits and the antenna coil used in accordance with the present invention. When the capacitance is derived fully from the integrated circuit, it typically lies in the range from 10 to 100 pF. Resonant circuits of this type are relatively easy to turn off-resonance, causing the interrogating range to be greatly restricted in an extremely disadvantageous manner. As already pointed out, in the case of the present invention the greater part of the total capacitance is supplied by the antenna coil. The latter typically has a capacitance of 500 pF to 5 nF, meaning that it is practically impossible for the resonant circuit to become off-resonance as a result of static charging through physical contact, for example.

According to an advantageous further aspect of the identification element of the present invention, provision is made for an additional capacitor that stores an amount of energy sufficient to activate the transponder as and when required. The energy stored in the capacitor originates from the interrogating signal of the transmit device. Preferably the capacitor has a capacitance in the range of 1 nF, which—in the case of the antenna coil itself—is obtainable by having at least two partly overlapping metal coatings separated by at least one dielectric layer. As in the case of the antenna coil, this form of production has a cost-cutting effect on the RFID transponder of the present invention. Aside from its low-cost production, the particular configuration of the additional capacitor is advantageous because its capacitance is higher by a factor of 10 than the capacitance of a corresponding capacitor on a semiconductor chip. The higher energy available as a result naturally increases the data transmission capacity of the identification element by a considerable amount.

Preferably the identification element of the present invention is used simultaneously as a security element for electronic article surveillance. In this case provision is made for a resonant frequency security element having a resonant frequency that differs from the resonant frequency of the identification element, the resonant frequency security element being tuned to the interrogating field of an electronic article monitoring device and emitting a characteristic signal as soon as it is incited to resonate by the article monitoring device. Such a system is known from European patent EP 0 181 327 B1, for example. The interrogating frequencies for the resonant frequency security element normally lie at 8.2 MHz; the interrogating frequency of the identification element could be situated in the range of 13.56 MHz, for example.

According to a particularly favorable embodiment, the identification element of the present invention and—where one exists—the resonant frequency security element are arranged on a substrate. The substrate involved is either paper or a synthetic material. Both substrate materials meet the requirements imposed on labels/tags: They are thin, flexible, easy-to-print and low-cost items. Plastic material has the additional advantage of being resistant to contact with water or chemical substances.

An object of the present invention with respect to the method is accomplished by contacting a non-encapsulated chip with an antenna coil comprised of at least one layer of a metallic coating.

According to an advantageous aspect of the method aspect of the present invention, it is proposed to perform the contacting between the chip and the antenna coil by means of the methods known in the art from the production of semi-conductors.

BRIEF DESCRIPTION OF THE DRAWINGS

The present invention will be explained in more detail in the following with reference to the accompanying drawing. In the drawing.

DETAILED DESCRIPTION

Figure 1:
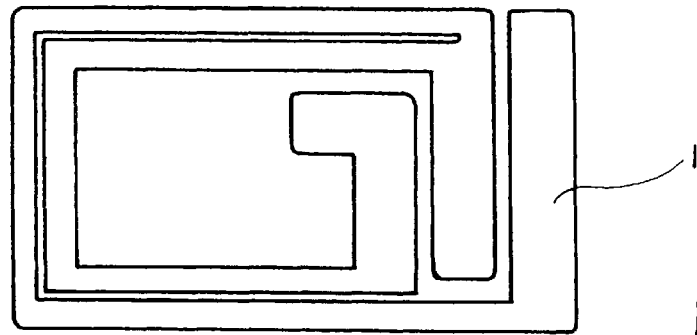
FIG. 1 is a top view of a first antenna coil used in the RFID transponder of the present invention.
Figure 2:
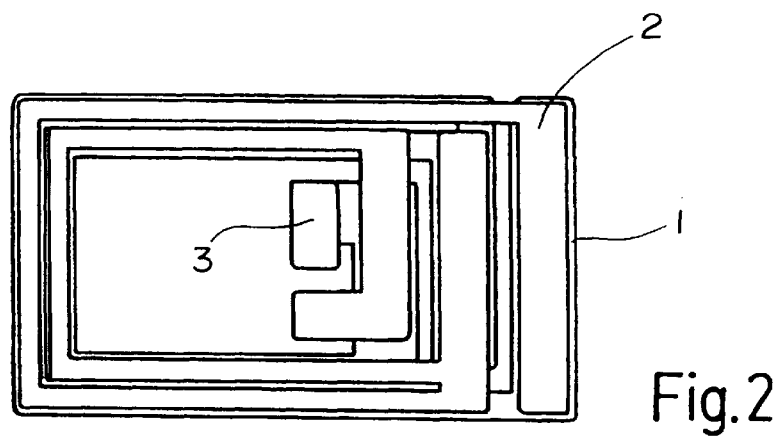
FIG. 2 is a top view of two antenna coils overlapping in certain areas.

FIG. 1 shows a top view of a first antenna coil 1 used in the RFID transponder 6 of the present invention. It is comprised of two coil turns, the outer turn being wound in opposite direction to the inner turn. As becomes apparent from FIG. 2, a second antenna coil 2 of a form essentially corresponding to the first antenna coil 1 is arranged above the first antenna coil 1 but turned 180° relative to it. The two antenna coils 1, 2 are separated in their overlap zone by a dielectric layer, not shown in the Figure. Preferably the two antenna coils 1, 2 are punched out of aluminum foil. The resonant circuit shown in FIG. 2 is produced, as previously mentioned, preferably by means of the method described in European published application EP 0 655 705.

Figure 4:
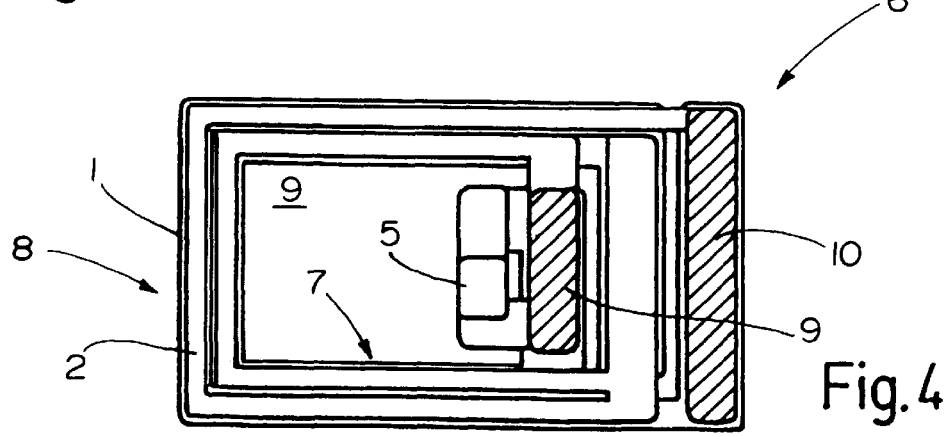
FIG. 4 is a top view of an advantageous configuration of the RFID transponder of the present invention.

The first antenna, coil 1 has an additional section 3, which—as becomes apparent from FIG. 4—is used for contacting the antenna coil 1 with the chip 5.

Figure 3:
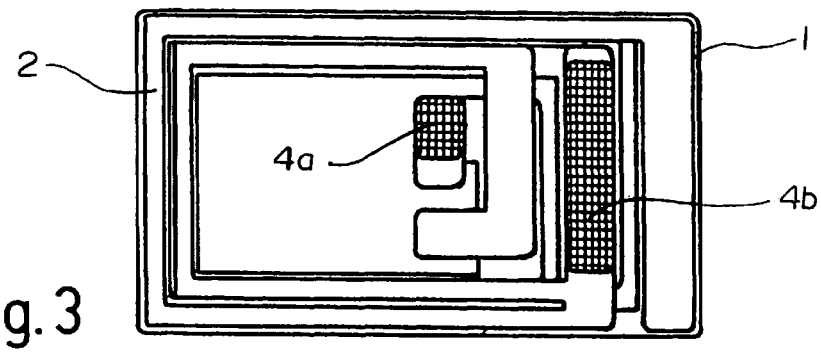
FIG. 3 is a top view of the two antenna coils of FIG. 2, the antenna coils being interconnected electrically in certain areas.

The antenna coils 1, 2 illustrated in FIG. 2 are shown again in FIG. 3 but with the antenna coils 1, 2 now interconnected electrically in certain areas 4a, 4b. Two resonant circuits, which are incited to resonate preferably in different frequency ranges, are created by the electrical connection in the areas 4a, 4b.

FIG. 4 shows an advantageous configuration of the RFID transponder 6 of the present invention, comprising an identification element 7 and a security element 8 for electronic article surveillance. The inner resonant circuit and the chip 5 connected to it electrically form the identification element 7. The resonant frequency of this circuit lies at around 13.56 MHz, for example. The connection between the chip 5 and the inner resonant circuit is made by one of the contacting methods known from semi-conductor technology.

The outer resonant circuit forms the electronic security element 8. The security element 8 is incited in the interrogating field of an article monitoring device to emit a characteristic signal. The interrogating frequency of an article monitoring device lies typically in the range of 8.2 MHz, which means that in the chosen example it deviates from the frequency of the RFID transponder 6. As becomes further apparent from FIG. 4, both the first antenna coil 1 and the second antenna coil are connected electrically to the chip.

The shaded fields 9, 10 of the resonant circuit for the identification element 7 and of the resonant circuit for the security element 8 mark in each case that area which contributes the bigger part to the total capacitance of each resonant circuit. If subsequent tuning of the resonant circuits is necessary it is done preferably in these areas 9, 10. As for suitable tuning methods, attention is drawn to the passages previously mentioned. Identifizierungselement und Verfahren zu seiner Herstel-lung—Identification Element and Method of Manufacturing the Same

| Bezugszeichenliste - List of References | | |
|---|---|---|
| 1; 2 | Antennenspule | antenna coil |
| 3 | Abschnitt | section |
| 4a, 4b | Bereich | area |
| 5 | Chip | chip |
| 6 | Transponder | transponder |
| 7 | Identifizierungselement, | identification element, |
| 8 | (Resonanzfrequenz-) Sicherungselement | (resonant frequency) security element |
| [7; 8] | Resonanzschwingkreis | resonant circuit] |
| 9, 10 | schraffierte Gebiete, Bereiche | shaded fields, areas |
| 11 | Trägermaterial | substrate |

What is claimed is:

1. An identification element having:
    an integrated circuit comprising a non-encapsulated chip; and
    an antenna coil (RFID transponder) connected to said integrated circuit, said antenna coil comprising at least one layer of a metallic coating.

2. The identification element as defined in claim 1, wherein said antenna coil forms a resonant circuit.

3. The identification element as defined in claim 2, wherein said resonant circuit possesses a O factor and wherein said Q-factor is at least higher than 50.

4. The identification element as defined in claim 2, wherein said resonant circuit has a capacitance associated therewith, and wherein said capacitance exceeds InF.

5. The identification element as defined in claim 2, wherein said resonant circuit includes a resonant frequency security element having a resonant frequency different from that of said identification element, and wherein said resonant frequency security element is turned to an interrogating field of an electronic article monitoring device, and emits a characteristic signal as soon as it is incited to resonate by the electronic article monitoring device.

6. The identification element as defined in claim 5, wherein at least one of said identification element and said resonant frequency security element are arranged on a substrate.

7. The identification element as defined in claim 1, wherein said antenna coil is connected to said non-encapsulated chip by a contacting method selected from one of a conductive adhesive; soldering; and the flipchip method, all of which are employed in the production of semiconductors.

8. The identification element as defined in clam 1, wherein said identification element has a capacitance associated therewith, said capacitance comprises the capacitance of said antenna coil, the capacitance of said integrated circuit, and wherein the capacitance of said antenna coil is greater than that of said integrated circuit.

9. The identification element as defined in claim 1, further having:
    a capacitor which stores an amount of energy sufficient to activate said non-encapsulated chip as and when required.

10. A method of manufacturing an identification element having an integrated circuit and an antenna coil (RFID transponder), comprising the steps of:
    forming the antenna coil as at least one layer of a metallic coating;
    forming the integrated circuit as a non-encapsulated chip; and
    connecting said antenna coil to the non-encapsulated chip.

11. The method as defined in claim 10, further comprising the step of: connecting the antenna coil to the non-encapsulated chip by a method selected from one of: a conductive adhesive; soldering; and the flipchip method, all of which are employed in the production of semiconductors.

\* \* \* \* \*

UNITED STATES PATENT AND TRADEMARK OFFICE
CERTIFICATE OF CORRECTION

PATENT NO. : 6,164,551
DATED : December 26, 2000
INVENTOR(S) : Richard Altwasser It is certified that error appears in the above-identified patent and that said Letters Patent is hereby corrected as shown below:

Claim 3, column 6,
Line 11, "O" should be "Q-".

Signed and Sealed this

Twenty-fifth Day of September, 2001

Attest:

*Nicholas P. Godici*

NICHOLAS P. GODICI
*Attesting Officer*     *Acting Director of the United States Patent and Trademark Office*